US009230426B2

(12) United States Patent
Hong et al.

(10) Patent No.: US 9,230,426 B2
(45) Date of Patent: Jan. 5, 2016

(54) UNIVERSAL REMOTE CONTROLLER AND REMOTE CONTROL METHOD THEREOF

(75) Inventors: Sung-soo Hong, Seoul (KR); Chang-seog Ko, Hwaseong-si (KR); Hyo-in Ahn, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 606 days.

(21) Appl. No.: 12/396,726

(22) Filed: Mar. 3, 2009

(65) Prior Publication Data

US 2010/0013695 A1 Jan. 21, 2010

(30) Foreign Application Priority Data

Jul. 16, 2008 (KR) ........................ 10-2008-0069044

(51) Int. Cl.

| | |
|---|---|
| ***G08C 19/12*** | (2006.01) |
| ***H04L 17/02*** | (2006.01) |
| ***G08C 17/02*** | (2006.01) |
| ***G08C 23/04*** | (2006.01) |

(52) U.S. Cl.

CPC ................ *G08C 17/02* (2013.01); *G08C 23/04* (2013.01); *G08C 2201/32* (2013.01)

(58) Field of Classification Search

USPC .......................................................... 341/176

See application file for complete search history.

(56) References Cited

U.S. PATENT DOCUMENTS 6,809,779 B2 * 10/2004 Chang et al. .................. 348/734
7,102,616 B1 * 9/2006 Sleator .......................... 345/158
7,224,903 B2 * 5/2007 Colmenarez et al. ......... 398/106
7,831,930 B2 11/2010 Dresti et al.
7,853,732 B2 12/2010 Kim et al.
7,895,532 B2 2/2011 Scott et al.
8,015,446 B2 9/2011 Scott et al.
8,473,865 B2 6/2013 Huang et al.
2003/0103088 A1 6/2003 Dresti et al.
2004/0208588 A1 10/2004 Colmenarez et al.
2005/0065619 A1 3/2005 Kim et al.
2006/0150120 A1 7/2006 Dresti et al.
2006/0161865 A1 7/2006 Scott et al.
2007/0043453 A1 * 2/2007 Buil ................................ 700/65
2007/0136693 A1 6/2007 Lilleness et al.

(Continued)

FOREIGN PATENT DOCUMENTS

KR 10-2004-0068146 A 7/2004
KR 10-2004-0071768 A 8/2004
KR 10-2005-0023126 A 3/2005

OTHER PUBLICATIONS

Communication, Issued by the Korean Intellectual Property Office, Dated Dec. 22, 2014, in counterpart Korean Application No. 10-2008-0069044.

(Continued)

*Primary Examiner* — Rexford Barnie
*Assistant Examiner* — Dru Parries
(74) *Attorney, Agent, or Firm* — Sughrue Mion, PLLC

(57) ABSTRACT

A universal remote controller and a remote control method thereof are provided. The universal remote controller includes a communication module which communicates with a plurality of devices; an input unit through which a user command is input; and a controlling unit which determines a pointed device, among the plurality of devices, that the universal remote controller is pointing towards, and controls the communication module to transmit the user command to the pointed device to control the pointed device.

18 Claims, 10 Drawing Sheets

(56) References Cited

U.S. PATENT DOCUMENTS

| | | | | |
|---|---|---|---|---|
| 2007/0296552 | A1* | 12/2007 | Huang et al. | 340/10.5 |
| 2009/0027336 | A1* | 1/2009 | Lin et al. | 345/158 |
| 2009/0231178 | A1* | 9/2009 | Letourneur et al. | 341/176 |
| 2009/0254778 | A1 | 10/2009 | Huang et al. | |
| 2010/0313169 | A1 | 12/2010 | Huang et al. | |
| 2010/0321201 | A1 | 12/2010 | Huang et al. | |
| 2011/0138327 | A1 | 6/2011 | Scott et al. | |
| 2011/0213472 | A1* | 9/2011 | Clayton et al. | 700/11 |
| 2013/0205216 | A1 | 8/2013 | Lilleness et al. | |
| 2014/0101563 | A1 | 4/2014 | Lilleness et al. | |
| 2014/0188484 | A1 | 7/2014 | Huang et al. | |
| 2014/0245142 | A1 | 8/2014 | Dresti et al. | |

OTHER PUBLICATIONS

Communication from the Korean Intellectual Property Office dated Jun. 16, 2015 in a counterpart Korean application No. 10-2008-0069044.

* cited by examiner

IDENTIFICATION INFORMATION : $(1,1,\lambda_1)$ $(2,2,\lambda_5)$ $(1,3,\lambda_6)$

UNIVERSAL REMOTE CONTROLLER AND REMOTE CONTROL METHOD THEREOF

CROSS-REFERENCE TO RELATED APPLICATIONS

This application claims priority under 35 U.S.C. §119 from Korean Patent Application No. 10-2008-0069044, filed on Jul. 16, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to a universal remote controller and a remote control method thereof, and more particularly, to a universal remote controller to conveniently control a plurality of devices using a single remote controller, and a remote control method thereof.

2. Description of the Related Art

Remote controllers may be used to control most electronic devices used in the home. As the number of electronic devices increases, the indoor environment becomes more complicated, and it is harder for a user to select a desired remote controller from among the remote controllers. Universal remote controllers compatible with a wide range of electronic devices have been developed to obviate this problem.

When a user uses a universal remote controller, the user inputs a control code of a desired electronic device to the universal remote controller. If the control code of the desired electronic device is input, the universal remote controller recognizes the electronic device A to be controlled, and the user controls the electronic device A using the universal remote controller. If a user desires to control an electronic device B, the user may input the control code of the electronic device B to the universal remote controller again.

Whenever a desired electronic device is changed, a user using a related art universal remote controller inputs a control code corresponding to the electronic device to the related art universal remote controller. If the user does not know the control code, the user cannot use the electronic device, or must manipulate the electronic device without using the remote controller.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a universal remote controller to conveniently control a plurality of devices without inputting a control code of device in advance, and a remote control method thereof.

According to an exemplary aspect of the present invention, there is provided a universal remote controller, including a communication module which communicates with a plurality of electronic devices, and points towards an electronic device to be remotely controlled among the plurality of electronic devices; an input unit which receives a user command for the pointed electronic device; and a controlling unit which controls the communication module to transmit the user command to the pointed electronic device.

Operations of pointing and sending a request to control the electronic device may be performed simultaneously.

The communication module may receive identification information for the plurality of electronic devices and a control information list required to control the plurality of electronic device, and further include a storage unit which stores the identification information for the plurality of electronic devices and the control information list for each of the plurality of electronic devices.

The identification information of the plurality of electronic devices may be emitted from the plurality of electronic devices, and the communication module determine the identification information for the pointed electronic device among the continuously emitted identification information, and provide the controlling unit with the determined identification information.

The controlling unit may determine an electronic device mapped with the identification information received from the pointed electronic device on the storage unit, identify control information corresponding to the user command on the control information list of the identified electronic device, and generates a control signal corresponding to the identified control information.

The identification information may include relative location information or flickering information of one or more light emitting diodes (LEDs) provided on each of the plurality of electronic devices.

The communication module may include an image sensor which receives the identification information, and the controlling unit may measure a Euclidean distance between a center of the image sensor and a center of LEDs of the electronic devices, and determine an electronic device having the shortest Euclidean distance to be the pointed electronic device.

The controlling unit may measure an incidence angle at which the plurality of electronic devices output the identification information with reference to the direction pointed by the communication module, and determine an electronic device having the smallest incidence angle to be the pointed electronic device.

The plurality of electronic devices may include a main device and a plurality of sub devices, wherein the main device may receive the identification information and the control information list from the plurality of sub devices, and transmit the received identification information and control information list to the communication module.

The plurality of electronic devices may transmit independently the pre-stored identification information and control information list to the communication module.

The communication module may communicate with the plurality of electronic devices using a wireless signal of a Bluetooth signal or a radio frequency (RF) signal.

According to another exemplary aspect of the present invention, there is provided a method for controlling a universal remote control, including pointing towards an electronic device to be remotely controlled among a plurality of electronic devices using a communication module; receiving a user command for the pointed electronic device; and transmitting the user command to the pointed electronic device through the communication module.

The method may further include receiving identification information of the plurality of electronic devices and a control information list to required to control the plurality of electronic device through the communication module prior to the pointing; and storing the identification information of the plurality of electronic devices and the control information list for each of the plurality of electronic devices.

The method may further include detecting the identification information of the pointed electronic device among the identification information transmitted from the plurality of electronic devices on the communication module after the pointing; determining an electronic device mapped with the identification information received from the pointed electronic device among the stored electronic information, and identifying the control information corresponding to the user command on the control information list of the determined electronic device; and generating a control signal corresponding to the identified control information, wherein the transmitting may include transmitting the generated control signal to the pointed electronic device.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
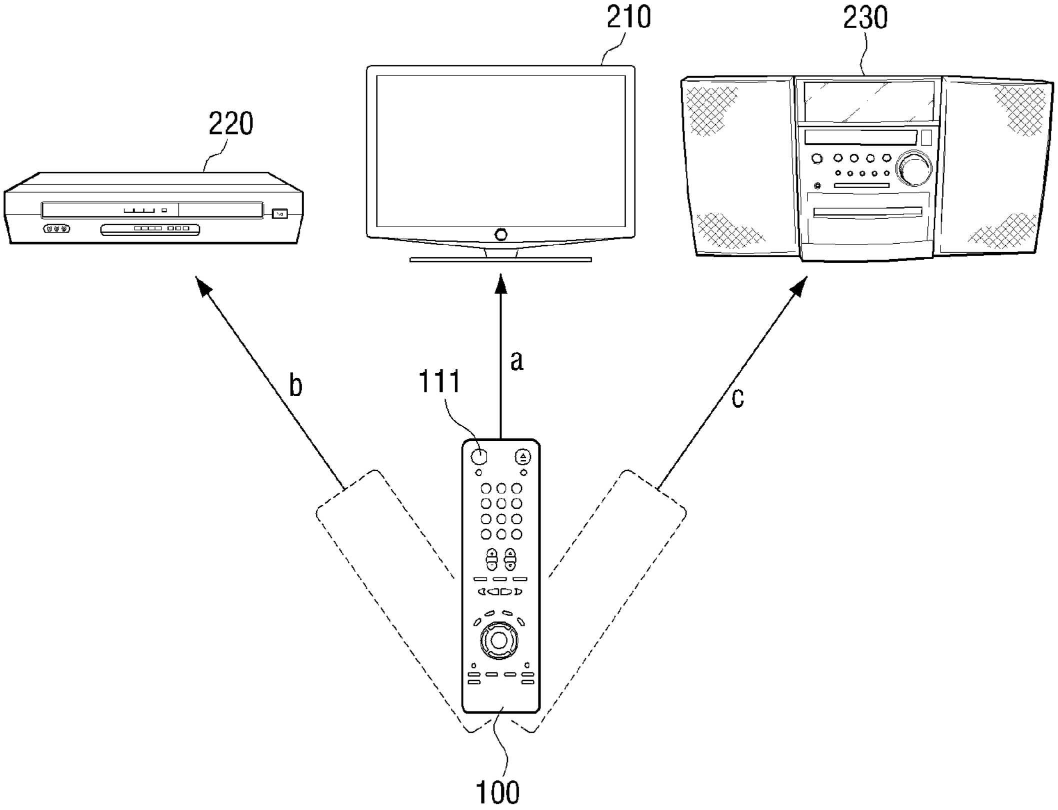
FIG. 1 is a view illustrating a universal control system applied to an exemplary embodiment of the present invention.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a view illustrating a universal control system applied to an exemplary embodiment of the present invention. Referring to FIG. 1, a universal control system may comprise a plurality of devices 210, 220, 230, and a universal remote controller 100.

The universal remote controller 100 according to an exemplary embodiment of the present invention is connected to the plurality of devices 210, 220, 230, to communicate therewith, points to the plurality of devices 210, 220, 230, and remotely controls the plurality of devices 210, 220, 230. The plurality of devices 210, 220, 230 may include any device which is capable of being remotely controlled, for example a digital television, an analog television, a digital video disk (DVD) player, a set-top box, a hard disk drive (HDD) recorder, a game console, an audio player, or a home theater system. Hereinbelow, the term “device” is used to refer to any electronic device.

A user may select a desired device by changing a pointing direction (a, b, c) of the universal remote controller 100 as shown in FIG. 1.

The universal remote controller 100 receives identification information and a control information list for the plurality of devices 210, 220, 230, and stores the identification information and the control information list. The universal remote controller 100 is pointed in the direction of a desired device among the plurality of devices 210, 220, 230, and controls the pointed desired device. The identification information includes an identification (ID) of each of the plurality of devices 210, 220, 230, and is used to determine a device to be controlled by the universal remote controller 100, which will be explained in detail with reference to FIGS. 5A to 5E.

The control information list includes control information for each function in order to control various functions provided by the devices 210, 220, 230. For example, if the device 220 is a DVD player, the device 220 provides various functions such as turning power on and off, setting volume, changing a channel, play back speed, or recording, and the control information list provides control information to control each function.

The control information may be different for each of the plurality of devices 210, 220, 230 even if the devices 210, 220, 230 provide the same function. For example, if all of the devices 210, 220, 230 are digital televisions of which channels may be changed, the control information required to change a channel differs for each of the devices 210, 220, 230 in order to prevent the same control information from manipulating two or more devices at the same time.

The universal remote controller 100 recognizes control information corresponding to a desired function from the control information list, and transmits the control signal corresponding to the recognized control information, for example an infrared signal, to the device 210.

Figure 2:
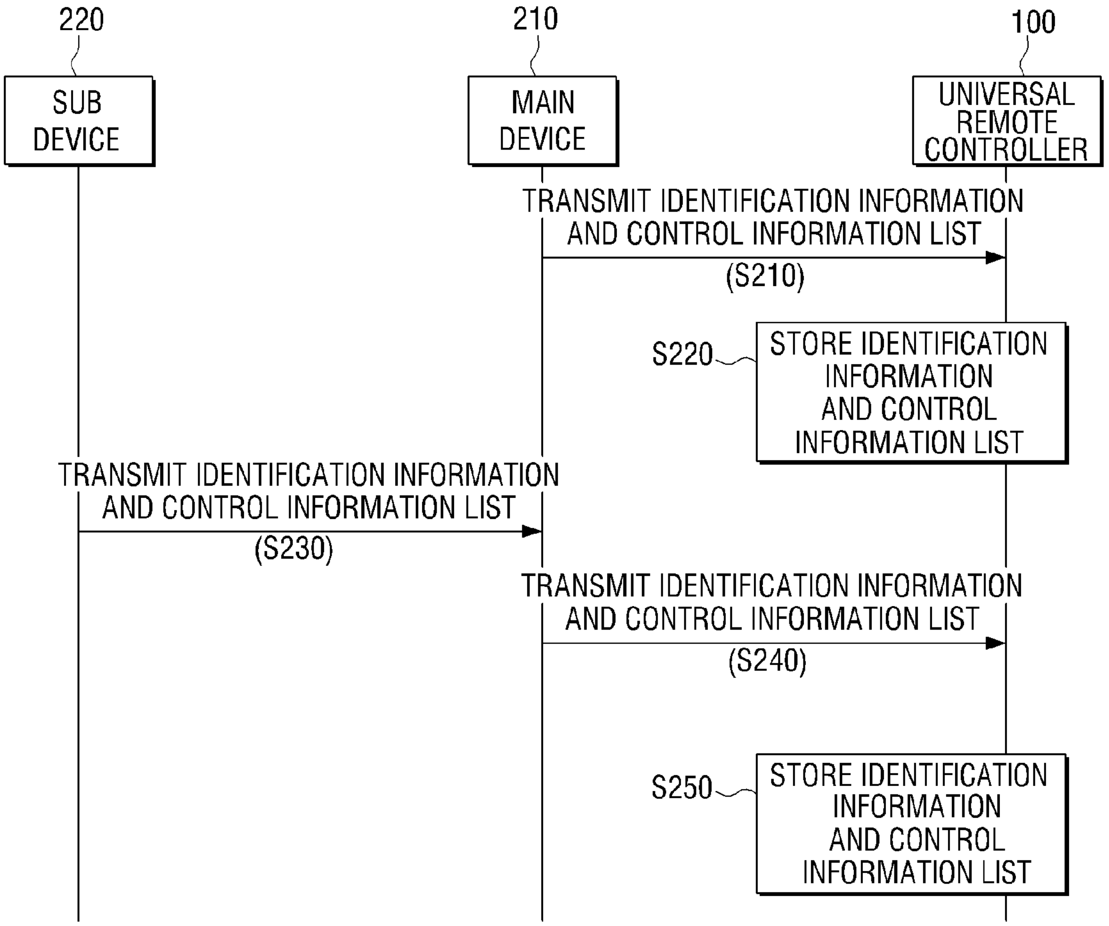
FIGS. 2 and 3 are diagrams provided to explain a method for storing identification information and a control information list.

FIG. 2 is a diagram provided to explain a method for storing identification information and a control information list according to an exemplary embodiment of the present invention.

Referring to FIGS. 1 and 2, the plurality of devices 210, 220, 230 include a main device 210 and a sub device 220. For example, the main device 210 may sold as a single product together with the universal remote controller 100.

When the main device 210 is installed, the main device 210 transmits identification information and a control information list of the main device 210 to the universal remote controller 100 (S210). The universal remote controller 100 maps the identification information and control information list with the main device 210, and stores the mapped identification information and control information list (S220).

If a new sub device, for example the sub device 220, is installed to communicate with the main device 210, the sub device 220 may transmit identification information and a control information list of the sub device 220 to the main device 210 (S230).

After the main device 210 and the sub device 220 are installed in operations S210 and S230, when the main device 210 and the sub device 220 are turned on for the first time, the identification information and control information list of the sub device 220 are transmitted automatically or as a result of user manipulation. If a user requests that the identification information and control information list of the sub device 220 are re-transmitted, the sub device 220 re-transmits the identification information and control information list of the sub device 220 to the main device 210.

The main device 210 transmits the received identification information and control information list of the sub device 220 to the universal remote controller 100 (S240).

The universal remote controller 100 maps the identification information and control information list transmitted from the main device 210 with the sub device 220, and stores the mapped identification information and control information list (S250).

The identification information and control information list are transmitted between the sub device 220 and the main device 210, and between the main device 210 and the universal remote controller 100, according to a predetermined communication method. The predetermined communication method may be wireless communication using infrared ray communication, Bluetooth communication, radio frequency (RF) communication, or wireless internet, or wire communication using a Universal Serial Bus (USB), an Institute of Electrical and Electronics Engineers (IEEE) 1394 interface, or a Recommended Standard (RS)-232. The method of communication between the sub device 220 and the main device 210 may be different from or identical to that between the main device 210 and the universal remote controller 100.

Figure 3:
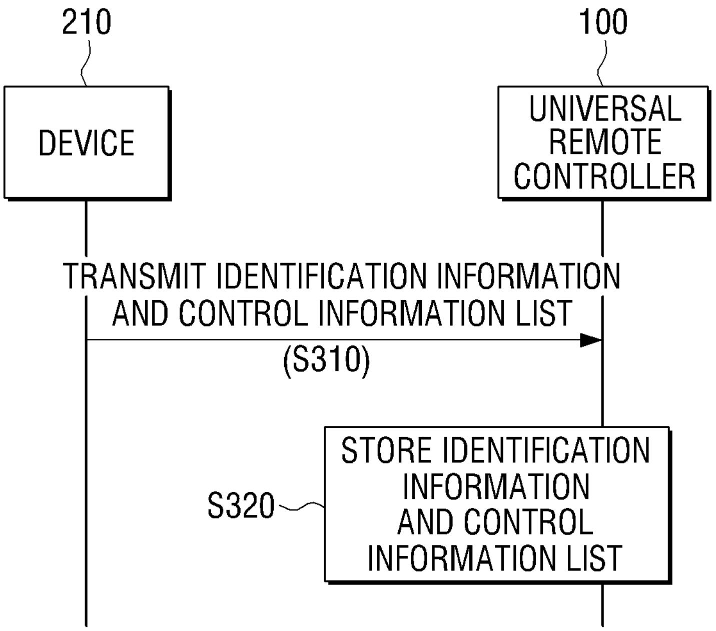

FIG. 3 is a diagram provided to explain a method for storing identification information and a control information list according to another exemplary embodiment of the present invention.

Referring to FIGS. 1 and 3, a plurality of devices provide a function of transmitting identification information and a control information list to the universal remote controller 100. If a new sub device, for example the sub device 220, is installed to communicate with the universal remote controller 100, the sub device 220 transmits the identification information and control information list of the sub device 220 to the universal remote controller 100 (S310).

The universal remote controller 100 maps the received identification information and control information list with the sub device 220, and stores the mapped identification information and control information list (S320). A user may control the plurality of devices 210, 220, 230 using the universal remote controller 100.

The sub device 220 and the universal remote controller 100 may transmit the identification information and control information list by wire or wireless communication described with reference to FIG. 2.

If a device communication unit 213 communicates using the method shown in FIG. 3, the device communication unit 213 is connected to the universal remote controller 100 to enable communication therebetween.

Figure 4:
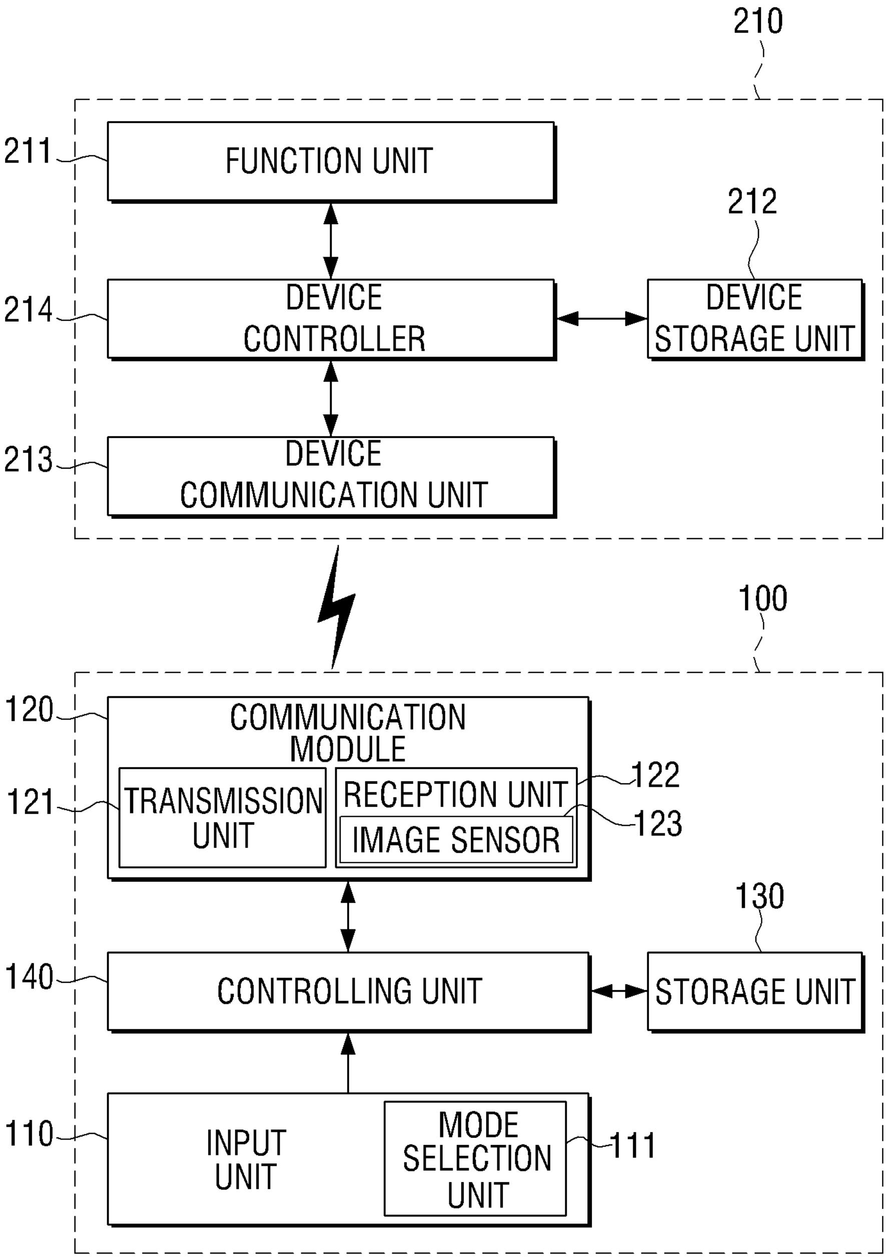
FIG. 4 is a block diagram illustrating a universal remote controller according to an exemplary embodiment of the present invention.

FIG. 4 is a block diagram illustrating a universal remote controller of FIG. 1 according to an exemplary embodiment of the present invention.

Referring to FIGS. 1 and 4, each of the plurality of devices 210, 220, 23 includes a function unit 211, a device storage unit 212, the device communication unit 213, and a device controller 214. Hereinbelow, the device 210 of the plurality of devices 210, 220, 230 will be explained as an example.

The function unit 211 performs basic functions provided by the device 210. If the device 210 is a digital television, the function unit 211 receives a digital broadcast signal, demodulates the received signal, processes the demodulated signal using decoding, outputs the processed signal, and thus provides a user with the digital broadcast.

The device storage unit 212 stores the identification information of the device 210 and the control information list required to control the function provided by the device 210. The stored identification information is the same as information generated by the location information of one or more LEDs provided on the device 210, or flickering information of the LEDs. That is, the stored identification information is identical to the identification information which the universal remote controller 100 generates using one or more LEDs provided on the device 210.

If the device communication unit 213 communicates using the method of FIG. 2, the device communication unit 213 is connected to one or more sub devices 220 and the universal remote controller 100 to enable communication therebetween according to the predetermined communication method.

When the device 210 is installed, the device communication unit 213 transmits the identification information and control information list of the device 210 to the universal remote controller 100. The device communication unit 213 receives a remote control signal corresponding to a user command transmitted form the universal remote controller 100. The remote control signal may be various signals such as an infrared signal, a Bluetooth signal, or a radio frequency (RF) signal.

When the device 210 is installed, the device controlling unit 214 controls the device communication unit 213 to transmit the identification information and control information list stored in the device storage unit 212 to the universal remote controller 100. If the identification information is represented as flickering information using infrared rays (IR), the device controlling unit 214 supplies power to one or more LEDs provided on the device 210 so that the LEDs continuously emit light. The LEDs provided on the device 210 thus output an infrared signal continuously. The device controlling unit 214 controls the function unit 211 to operate according to the user command received from the universal remote controller 100.

Referring to FIG. 4, the universal remote controller 100 may comprise an input unit 110, a communication module 120, a storage unit 130, and a controlling unit 140.

The input unit 110 receives a command from a user. The user may request that a desired function be performed by manipulating a plurality of numeral keys, letter keys, and function keys provided on the input unit 110. The user may input a command, that is a desired function, while pointing a target device using the universal remote controller 100.

The input unit 110 may further comprise a mode selection unit 111. The mode selection unit 111 is a button or a switch to select a universal control mode or a single control mode. In the universal control mode, a user may point the universal remote controller 100 toward a target device among the devices 210, 220, 230, and control the target device. In the single control mode, a user may control only one device, for example the device 210. The single control mode may be set as a default.

The mode selection unit 111 is merely optional, and may not be provided. If the mode selection unit 111 is provided, a user may set the universal remote controller 100 to be universally controlled irrespective of the currently set mode.

If a user selects the mode selection unit 111 once, the universal remote controller 100 is changed from the single control mode to the universal control mode, and if the user selects the mode selection unit 111 again, the universal control mode is changed to the single control mode. The user may control a desired device in the universal mode, and may control only one device in the single control mode. Hereinbelow, the universal control mode will be explained.

The input unit 110 may further comprise a pointing button (not shown). A user uses the pointing button to facilitate selection of a device by pointing. If a user presses the pointing button, a transmission unit 121 emits a visible laser. The user may thus recognize which device the universal remote controller 100 points towards, and may easily adjust the pointing direction.

The communication module 120 may remotely communicate with the plurality of devices 210, 220, 230, and is connected to the plurality of devices 210, 220, 230 to enable communication therebetween according to a predetermined communication method so that the universal remote controller 100 may remotely control the plurality of devices 210, 220, 230. The communication module 120 points to a device to be remotely controlled among the plurality of devices 210, 220, 230 according to user manipulation, and provides the controlling unit 140 with identification information regarding the pointed device.

The communication module 120 may comprise the transmission unit 121 and a reception unit 122.

The transmission unit 121 transmits a user command received from the input unit 110 to a target device, for example the device 210, using a remote control signal such as an infrared signal. The device 210 performs an operation corresponding to the remote control signal transmitted from the transmission unit 121.

The reception unit 122 receives identification information and a control information list from the device 210, and transmits the received identification information and control information list to the controlling unit 140. The reception unit 122 receives an infrared signal being continuously emitted by the devices 210, 220, 230 through an IR image sensor 123 included in the reception unit 122. The image sensor 123 may be a geomagnetic sensor.

A user points the universal remote controller 100 toward a target device, for example the device 210, among the plurality of devices 210, 220, 230 so that the image sensor 123 faces the device 210. The user may request a command at the same time as pointing the device 210, or after pointing the device 210. The controlling unit 140 determines the pointed device 210, which will be explained with reference to FIGS. 6 and 7.

If it is determined which device being pointed to, the image sensor 123 detects array information or flickering information of one or more LEDs using an infrared signal received from the one or more LEDs provided on the pointed device 210, and provides the controlling unit 140 with the detected array information and flickering information as information to identify the pointed device 210. The array information represents relative location information of each LED. If a plurality of LEDs are provided, the plurality of LEDs may emit different wavelengths or the same wavelength.

Hereinbelow, a method in which the image sensor 123 acquires identification information of a device will be explained with reference to FIGS. 5A to 5E.

Figure 5A:
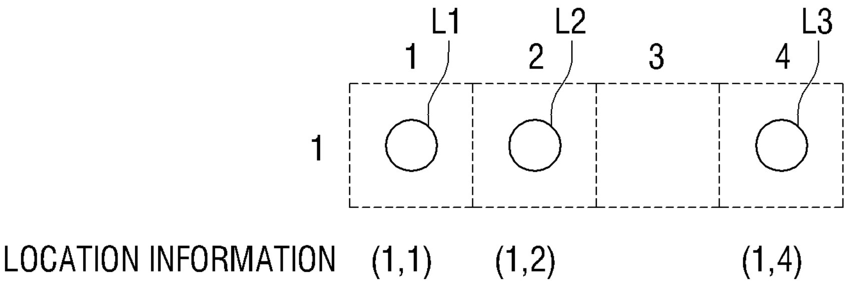
FIGS. 5A and 5B are diagrams provided to explain an exemplary case in which identification information is generated using location information provided by light emitting diodes (LEDs)
Figure 5B:
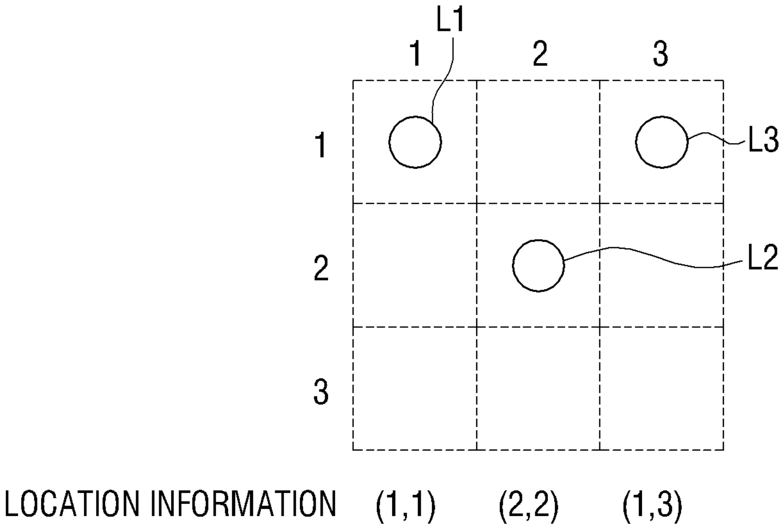

FIGS. 5A and 5B are diagrams provided to explain an exemplary case in which identification information is generated using location information provided by LEDs. Referring to FIG. 5A, a plurality of LEDs L1 to L3 are arranged in a row on a device, and the image sensor 123 represents the location on which each of the plurality of LEDs L1 to L3 emits light as an array. The image sensor 123 detects the location information (1, 1), (1, 2), (1, 4) of each of the plurality of LEDs L1 to L3, and generates identification information for the device 210 using the detected location information.

Referring to FIG. 5B, the plurality of LEDs L1 to L3 are arranged on a device in a zigzag pattern, which represents the location on which each of the plurality of LEDs L1 to L3 emits light as a matrix. The image sensor 123 determines the location information (1, 1), (2, 2), (1, 3) of each of the plurality of LEDs L1 to L3, and generates identification information for the device 210 using the detected location information.

Figure 5C:
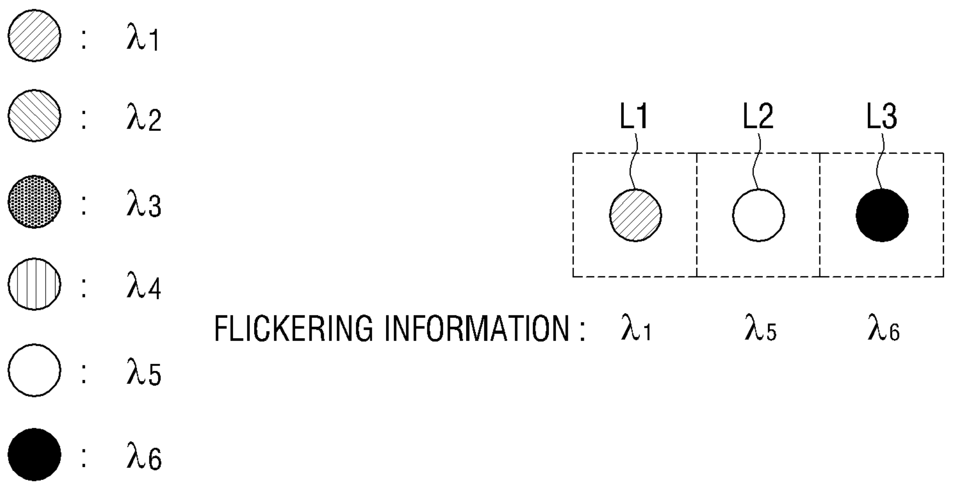
FIG. 5C is a diagram provided to explain an example of generating identification information using flickering information provided by LEDs.

FIG. 5C is a diagram provided to explain an example of generating identification information using flickering information provided by LEDs. Referring to FIG. 5C, the plurality of LEDs L1 to L3 emit light having different colors, respectively, and thus emit wavelengths (λ1, . . . , λ6) corresponding to each color. The number of different wavelengths is not limited to six. If three LEDs L1 to L3 are provided, the image sensor 123 detects wavelengths λ1, λ5, λ6 of an infrared signal received from the LEDs L1 to L3, and generates identification information for the device 210 using the detected wavelengths λ1, λ5, λ6.

Figure 5D:
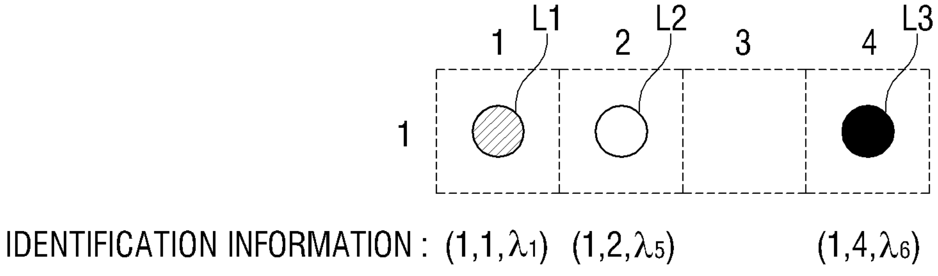
FIGS. 5D and 5E are views provided to explain an example of identification information being generated using relative location information and flickering information provided by LEDs.
Figure 5E:
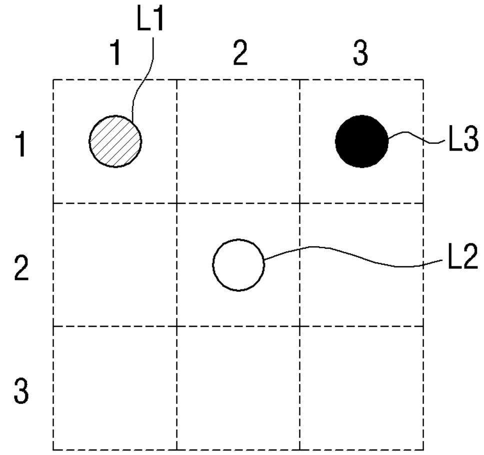

FIGS. 5D and 5E are views provided to explain an example of identification information being generated using relative location information and flickering information of an LED.

Referring to FIG. 5D, if the plurality of LEDs L1 to L3 as shown in FIG. 5A emit wavelengths as shown in FIG. 5C, the image sensor 123 detects wavelengths (1,1,λ1), (1,2,λ5), (1,4,λ6), and generates identification information for the device 210 using the detected wavelengths (1,1,λ1), (1,2,λ5), (1,4,λ6).

Referring to FIG. 5E, if the plurality of LEDs L1 to L3 as shown in FIG. 5B emit wavelengths as shown in FIG. 5C, the image sensor 123 detects wavelengths (1,1,λ1), (2,2,λ5), (1,3,λ6), and generates identification information for the device 210 using the detected wavelengths (1,1,λ1), (2,2,λ5), (1,3,λ6).

Referring to FIG. 4, the storage unit 130 stores the identification information and control information list for the plurality of devices 210, 220, 230 received from the reception unit 122 for each device 210, 220, 230 under the control of the controlling unit 140. For example, the identification information and control information list for each device 210, 220, 230 may be stored in a lookup table. The identification information provides information to identify a target device towards which the image sensor 123 is pointed. The control information list includes control information required to control functions provided by each device 210, 220, 230 for each function.

The controlling unit 140 controls operations of the units of the universal remote controller 100. If the universal remote controller 100 is in a universal control mode, the controlling unit 140 determines a device towards which a user points the universal remote controller 100, for example the device 210. If a user points the device 210 for at least a predetermined time period, the controlling unit 140 may be implemented to determine the pointed device 210. For example, a timer may be mounted in the universal remote controller 100 to measure the time period for which the device 210 is pointed.

The controlling unit 140 calculates the Euclidean distance between the center of a surface of the image sensor 123 and the center of LEDs of the devices 210, 220, 230, and determines a device having the shortest distance to be a target device.

Figure 6:
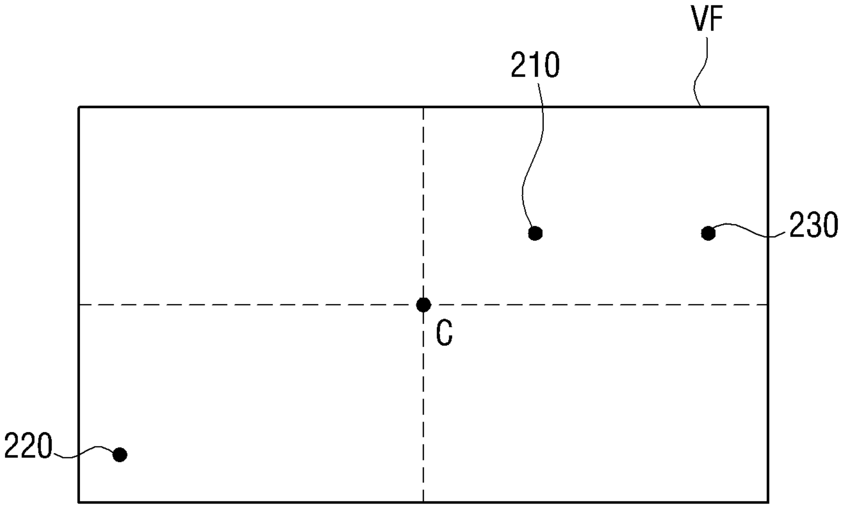
FIG. 6 is a diagram provided to explain a method that a controlling unit determines a pointed device using the Euclidean distance.

FIG. 6 is a diagram provided to explain a method that a controlling unit determines a pointed device using the Euclidean distance.

Referring to FIG. 6, the image sensor 123 performs functions of a viewfinder (VF) of a camera. The controlling unit 140 calculates the Euclidean distance between the center of the LED of the devices 210, 220, 230 displayed on the VF and the center C of the VF. In FIG. 6, the device 210 has the shortest Euclidean distance. The controlling unit 210 determines the device 210 to be a pointed device, and controls the image sensor 123 to generate identification information for the pointed device 210.

Alternatively, the controlling unit 140 receives an infrared signal emitted from each device 210, 220, 230, measures an angle of incidence of each infrared signal, and determines a device having the smallest angle of incidence to be a pointed device.

Figure 7:
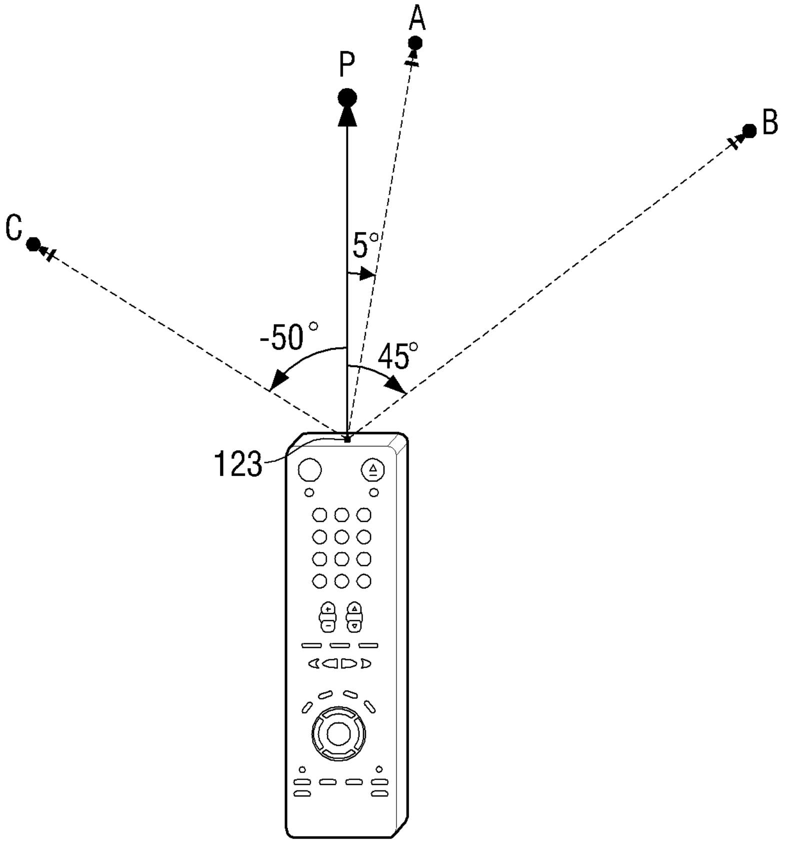
FIG. 7 is a diagram provided to explain a method that a controlling unit determines a pointed device using an incidence angle.

FIG. 7 is a diagram provided to explain a method that a controlling unit determines a pointed device using an incidence angle.

Referring to FIG. 7, the controlling unit 140 measures an incidence angle at which the identification information enters the image sensor 123 with reference to the direction in which the image sensor 123 points. The pointed direction P is shown in FIG. 7. If the image sensor 123 receives the identification information from LEDs A, B, C for each of the plurality of devices 210, 220, 230, the controlling unit 140 measures the incidence angle of the received identification information with reference to the pointed direction P.

If the device 210 corresponds to the incidence angle 5°, if the device 220 corresponds to the incidence angle −50°, and if the device 230 corresponds to the incidence angle 45°, the device 210 has the smallest absolute incidence angle. Thus, the controlling unit 140 determines that the device 210 is pointed, and controls the image sensor 123 to detect identification information for the device 210.

If the pointed device 210 is determined, the controlling unit 140 controls the image sensor 123 to detect the identification information for the device 210. If the identification information for the device 210 is detected by the image sensor 123, the controlling unit 140 determines the device corresponding to the same identification information as the detected identification information on the storage unit 130.

The controlling unit 140 determines the control information corresponding to the user command input from the input unit 110 on the storage unit 130. For example, if a user inputs a command to turn off the device 210, the controlling unit 140 determines the control information mapped with the power off command from the storage unit 130, and controls the transmission unit 121 to transmit the control signal corresponding to the determined control information. The transmission unit 121 generates a control signal of a pulse corresponding to the control information, and transmits the generated control signal. The device 210 is turned off in response to the control signal.

Figure 8:
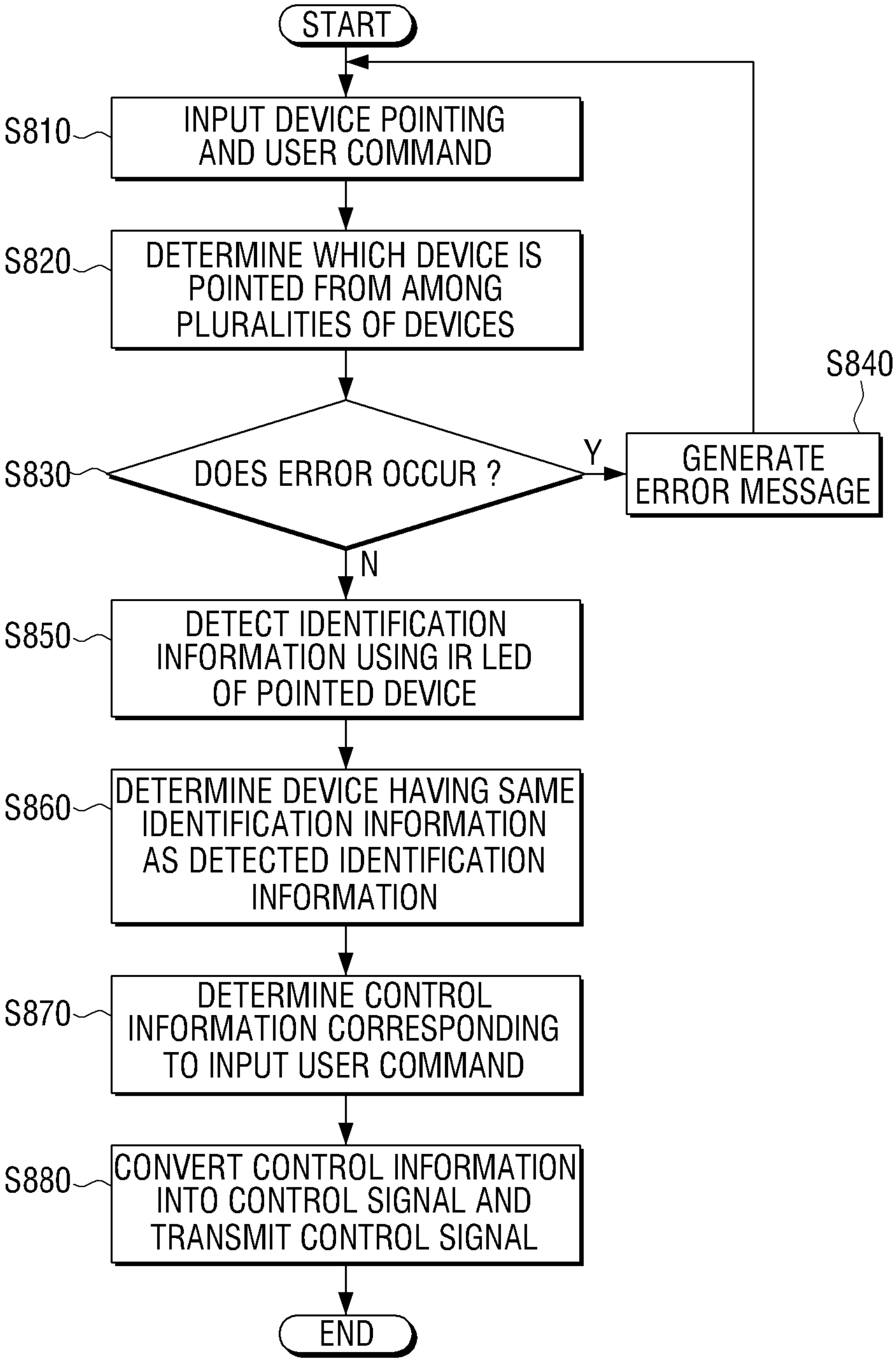
FIG. 8 is a flowchart to explain a method for controlling a universal remote controller according to an exemplary embodiment of the present invention.

FIG. 8 is a flowchart to explain a method for controlling a universal remote controller according to an exemplary embodiment of the present invention.

Referring to FIGS. 1 to 8, if the universal remote controller 100 is in a mode to control each device 210, 220, 230, a user points one of the devices 210, 220, 230, and the input unit 110 receives a command from the user (S810). The operations of pointing a device and inputting a command may be performed sequentially or simultaneously.

The controlling unit 140 determines which device is pointed in operation S810 (S820). For example, the controlling unit 140 may determine the pointed device using the method described in FIG. 6 or FIG. 7.

If an error occurs (S830), that is if the pointed device is not determined, the controlling unit 140 generates an error message so that a user can determine that the error has occurred. The error message may be an alarm or a flash by a light emitting device (not shown) provided on the input unit 110. Thus, the user may again point the pointed device towards a device he or she desires to control (S810). The universal remote controller 100 may comprise an alarm (not shown) or a flash (not shown) to generate an error message.

In FIG. 6, if it is determined that there are at least two devices having the shortest Euclidean distance, the controlling unit 140 generates an error message. In FIG. 7, if it is determined that there are at least two devices having the smallest incidence angle, the controlling unit 140 generates an error message.

If an error message is not generated (S840), that is if the pointed device is determined, the controlling unit 140 controls the image sensor 120 to detect identification information of the pointed device, for example a device A (S850). In operation S850, the image sensor 123 detects identification information for the device 210 using one of the methods described with reference to FIGS. 5A to 5E.

The controlling unit 140 determines a device having the same identification information as the identification information detected in operation S850 on the storage unit 130 (S860).

The controlling unit 140 determines the control information corresponding to the user command input in operation S810 on the control information list for the device 210 stored in the storage unit 130 (S870).

The controlling unit 140 controls the transmission unit 121 to convert the determined control information into a control signal, and to transmit the control signal (S880). The control signal may be a signal capable of being transmitted, and may be an infrared signal having a specific wavelength. The device 210 receives the transmitted control signal, and performs the function corresponding to the received control signal. That is, the device 210 may perform the operation corresponding to the user command input in operation S810.

According to a universal remote controller according to exemplary embodiments of the present invention, and a remote control method thereof, a user points towards a device to be controlled using the universal remote controller as if the user indicates an object with a finger, and thus it is possible to control operations of the device. Therefore, exemplary embodiments of the present invention may provide a user with a method for controlling a device more instinctively.

According to exemplary embodiments of the present invention, devices may be classified using identification information for an LED provided on each device. The identification information may be obtained by combining the location information and flickering information of an IR LED having low power consumption. Therefore, a plurality of devices are classified and controlled.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A universal remote controller comprising:

a communication module which wirelessly communicates with a plurality of devices;

an input unit through which a user command is input; and a controlling unit which controls the communication module to wirelessly and directly receive identification information and a control information list from an external device, determines, based on the received identification information and a signal, a pointed device, which is a device that the universal remote controller is pointing towards, and controls the communication module to transmit a control signal generated based on the received control information list to the pointed device in response to the user command input through the input unit, wherein the identification information comprises relative location information of a plurality of light emitting diodes (LEDs) provided on each of the plurality of devices or flickering information based on the wavelength of each of the LEDs provided on each of the plurality of devices, and wherein the control information list comprises control information for each function in order to control one or more functions of the plurality of devices.

2. The universal remote controller of claim 1, wherein the user command is input while the universal remote controller is pointing toward the pointed device.

3. The universal remote controller of claim 1, wherein the identification information of the plurality of devices is continuously emitted from the plurality of devices, and the communication module determines the identification information for the pointed device among the continuously emitted identification information, and provides the determined identification information to the controlling unit.

4. The universal remote controller of claim 3, further comprising a storage unit which stores the identification information and the control information received from the plurality of devices, wherein the controlling unit determines a device mapped with the identification information received from the pointed device on the storage unit as the pointed device, identifies control information corresponding to the user command on the control information of the pointed device, and generates a control signal corresponding to the identified control information.

5. The universal remote controller of claim 1, wherein the communication module comprises an image sensor which receives the identification information, and the controlling unit measures a Euclidean distance between a center of the image sensor and a center of the one or more LEDs of each of the devices, and determines a device having the shortest Euclidean distance to be the pointed device.

6. The universal remote controller of claim 1, wherein the controlling unit measures an incidence angle at which the plurality of devices output the identification information with reference to a direction pointed by the communication module, and determines a device having the smallest incidence angle to be the pointed device.

7. The universal remote controller of claim 1, wherein the plurality of devices comprise a main device and at least one sub device, wherein the main device receives the identification information and the control information from the at least one sub device, and transmits the received identification information and control information to the communication module.

8. The universal remote controller of claim 1, wherein the plurality of devices transmit independently the identification information and control information to the communication module.

9. The universal remote controller of claim 1, wherein the communication module communicates with the plurality of devices using a Bluetooth signal or a radio frequency signal.

10. A method for controlling a device using a universal remote controller, the method comprising:

wirelessly and directly receiving identification information and a control information list from an external device, the identification information comprising relative location information of a plurality of light emitting diodes (LEDs) provided on each of the plurality of devices or flickering information based on the wavelength of each of the LEDs provided on each of the plurality of devices, the control information list comprising control information for each function in order to control one or more functions of the plurality of devices;

determining, based on the received identification information and a signal, a pointed device, which is a device that the universal remote controller is pointing towards;

receiving, at the universal remote controller, a user command for the pointed device; and transmitting, from the universal remote controller, a control signal generated based on the received control information list to the pointed device in response to the user command input through the input unit.

11. The method of claim 10, wherein the user command is input while the universal remote controller is pointing toward the pointed device.

12. The method of claim 10, wherein the determining the pointed device comprises:

detecting the identification information of the pointed device among the identification information transmitted from the plurality of devices;

determining a device mapped with the identification information received from the pointed device among the stored identification information as the pointed device, and identifying the control information corresponding to the user command on the control information of the pointed device; and generating a control signal corresponding to the identified control information, wherein the transmitting comprises transmitting the generated control signal to the pointed device.

13. The method of claim 10, wherein the universal remote controller points the pointed device by emitting a laser.

14. The method of claim 10, wherein the communication module communicates with the plurality of devices using a Bluetooth signal or a radio frequency (RF) signal.

15. The universal remote controller of claim 1, wherein the communication module receives identification information for the plurality of devices and the control information required to control the plurality of devices from the at least one of the plurality of devices at a time of installation of the plurality of devices or upon request by the universal remote controller.

16. The method of claim 10, wherein the universal remote controller receives the identification information of the plurality of devices and the control information required to control the plurality of devices from the at least one of the plurality of devices at a time of installation of the plurality of devices or upon request by the universal remote controller.

17. A universal remote controller comprising:

a communication module which wirelessly communicates with a plurality of devices;

an user interface (UI) unit to which a user command is input;

a controlling unit which controls the communication module to wirelessly and directly receive identification information and a control information list from an external device, determines a pointed device, among the plurality of devices, based on the received identification information that the universal remote controller is pointing towards, maps the UI unit onto the control information for the pointed device, and controls the communication module to transmit a control signal generated based on the received control information list to the pointed device if the user command is input through UI unit, wherein the identification information comprises relative location information of a plurality of light emitting diodes (LEDs) provided on each of the plurality of devices or flickering information based on the wavelength of each of the LEDs provided on each of the plurality of devices, and wherein the control information list comprises control information for each function in order to control one or more functions of the plurality of devices.

18. The universal remote controller of claim 1, wherein the external device comprises at least one of the plurality of devices.

* * * * *